United States Patent
Klassen

(10) Patent No.: US 8,089,668 B2
(45) Date of Patent: Jan. 3, 2012

(54) METHOD OF COMPENSATING FOR CLIPPING IN INPUT SCANNERS

(75) Inventor: R. Victor Klassen, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 439 days.

(21) Appl. No.: 12/467,428

(22) Filed: May 18, 2009

(65) Prior Publication Data
US 2010/0290091 A1     Nov. 18, 2010

(51) Int. Cl.
*H04N 1/00*     (2006.01)
*H04N 1/04*     (2006.01)

(52) U.S. Cl. ......... 358/504; 358/406; 358/474; 358/518

(58) Field of Classification Search .................. 358/504, 358/406, 474, 518, 530, 3.26; 382/286; 345/589, 345/590
See application file for complete search history.

(56) References Cited

U.S. PATENT DOCUMENTS

| | | | |
|---|---|---|---|
| 7,336,399 B2* | 2/2008 | Nara ............................ | 358/3.26 |
| 2002/0060819 A1* | 5/2002 | Nara ............................ | 358/530 |
| 2008/0019611 A1* | 1/2008 | Larkin et al. .................. | 382/287 |

\* cited by examiner

*Primary Examiner* — Kimberly A Williams
(74) *Attorney, Agent, or Firm* — Fay Sharpe LLP

(57) ABSTRACT

Systems and methods are described that facilitate improving error estimation for calibration error due to clipping of pixels, and compensation therefor, during calibration of a scanner or printer. Calibration patches are measured at a first maximum pixel value threshold and at a slightly lower threshold value. Pixel values for the patches at each threshold are averaged, and a linear model is constructed, which is employed to predict error due to pixel clipping. The error is then compensated for when calibrating the scanner or printer.

20 Claims, 4 Drawing Sheets

METHOD OF COMPENSATING FOR CLIPPING IN INPUT SCANNERS

BACKGROUND

The subject application relates to document scanner calibration systems and methods. While the systems and methods described herein relate to document scanners and the like, it will be appreciated that the described techniques may find application in other scanning systems, other xerographic applications, and/or other calibration methods.

Document scanners generally produce a fixed number of bits (e.g., 8) per separation, forcing their values to be within a specific range. One design parameter that affects scanner calibration is the level to which the "white" value of a calibration strip translates when the calibration is applied. Using classical approaches, values brighter than the white calibration value are clipped. A very small amount of clipping is desirable in most applications, since for all but the very few pixels clipped, the image has a higher dynamic range. However, when a scanner is used as a surrogate for a spectrophotometer, for example, clipped pixels contribute to erroneous patch averages. Classical approaches address such errors in several ways. For instance, one approach is to ignore the problem and trust a data fitting technique to reduce its effect. Another approach is to discard patches containing any clipped pixels. Yet another approach involves using a scanner with less gain, and therefore less (or no) chance of clipping any pixels, which has the undesirable effect of reducing dynamic range, and hence the number of actual brightness levels available.

In at least one scanner, 10-bit values are generated by a digital to analog converter and these values are converted to 8 bit values when a calibration process is applied. Accuracy at the dark end of the brightness spectrum is limited both by quantization and noise. It is difficult to reduce noise without increasing the cost of the scanner, other than by increasing the number of pixels averaged. However, in the process of converting from 10 bit digital-to-analog conversion (DAC) values to 8 bit scan values, the measured values are translated and scaled based on values obtained in a calibration and fixed parameters. Assuming a white calibration strip is perfectly uniform, the values are scaled so that the value read from the white calibration strip is W, which is an adjustable (by the manufacturer) parameter. Setting the value of W too low increases quantization error, particularly at the dark end (e.g., choosing a value of 100 means that there is a single step between 1% and 2%, whereas setting W equal to 400 increases this to four steps); setting W too high increases clipping (e.g., if W is 255, then any pixels that receive more light than the calibration strip will be clipped, as will any which, due to noise, would otherwise register values greater than 255).

According to an example, a scanner, when measuring a patch of white paper in a random surround, detects a mean value around 244 with a standard deviation around 5.7, with the default setting of W. While the reported mean white value is substantially below 255, it is to be expected that any patch of, for instance, 50×50 pixels will have a substantial number of pixels that register at values greater than 255 (e.g., approximately 2.5%, or 60 pixels). Due to integrating cavity effect, lighter surrounds will increase the number of saturated pixels, while darker surrounds will decrease the number. Statistically, it would be expected that the vast majority of these saturated pixels would be no greater than 244+3×5.7=244+17.1=261.1 (that is, all but 0.13% of the total, or 3 pixels). Even with all pixels at an improbably large value such as 261, the error in the mean due to these 60 or so pixels being underestimated by 6/255, is only 0.15 (0.06 is more typical), while the estimated error in the mean (i.e., the standard error of the mean) is 0.114. A small increase in W could make this significant: if all the true values were scaled and then clipped so that the mean of the unclipped values would be 250, the standard deviation would scale to 5.87, which means that nearly 20% of the pixels will be clipped, with an error of approximately 0.64, which is substantially greater than the standard error of the mean.

The error resulting from clipping generally increases as the number of pixels clipped increases, rising slowly until the number approaches 50% of the pixels. For a theoretical example of 2500 normally-distributed pixels, with a mean value of 244, the quantization error rises exponentially.

In reality, the distribution is not normal (e.g., for white paper it might be close, but for light patches containing a small amount of toner it will be bi-modal). However the principle still holds: as the number of pixels clipped increases, the error in the mean increases exponentially, and even for relatively small numbers of clipped pixels, it increases.

Accordingly, there is an unmet need for systems and/or methods that facilitate compensating for clipping in input scanners and the like, while overcoming the aforementioned deficiencies.

SUMMARY

In accordance with various aspects described herein, systems and methods are described that facilitate improving error estimation for calibration of a scanner or printer. For example, a method of calibrating a scanner or printer comprises measuring pixel values, for one or more calibration patches comprising a plurality of pixels, at each of a first predetermined maximum pixel value and a second predetermined maximum pixel value. The method further comprises computing a first average pixel value from scan data acquired at the first predetermined maximum pixel value and identifying a first set of omitted pixels, and computing a second average pixel value from scan data acquired at the second predetermined maximum pixel value and identifying a second set of omitted pixels. The method additionally comprises identifying calibration patches that do not have pixels omitted when measured at the first predetermined maximum pixel value, but that have pixels omitted when measured at the second predetermined maximum pixel value. Moreover, the method comprises generating a linear model from the identified calibration patches, wherein the linear model is used to predict patch averages based on the pixels having pixel values below the second predetermined maximum pixel value and a number of omitted pixels from each of a plurality of color separations. The method further comprises employing the linear model to determine an error between the first and second average pixel values, and calibrating the scanner while compensating for the determined error.

According to another feature described herein, a system that facilitates calibration error estimation for device calibration comprises a scan bar that scans a plurality of calibration patches, wherein each calibration patch comprises a plurality of pixels, and a processor that measures pixel values for scans performed at each of a first threshold pixel value and a second threshold pixel value. The processor computes a first average pixel value from scan data acquired at the first threshold pixel value, and identifies a first set of pixels clipped at the first threshold pixel value. The processor then computes a second average pixel value from scan data acquired at the second threshold pixel value, and identifies a second set of pixels clipped at the second threshold pixel value. The processor identifies calibration patches that do not have pixels clipped when measured at the first threshold pixel value, but that have pixels clipped when measured at the second threshold pixel value. The processor generates a linear model from the identified calibration patches, wherein the linear model is employed to predict calibration patch pixel value averages based on the pixels having pixel values below the second threshold pixel value and a number of clipped pixels from each of a plurality of color separations.

Yet another feature relates to a method of compensating for scanner calibration error due to pixel clipping comprises scanning a plurality of calibration patches at first and second clipping threshold values, determining an average pixel value for patches that have no pixels clipped at the first clipping threshold value, and determining an average pixel value for patches that have no pixels clipped at the second clipping threshold value. The method further includes compensating for the error when calibrating the scanner device.

DETAILED DESCRIPTION

In accordance with various features described herein, systems and methods are described that overcome the above-described problems by increasing the accuracy of a calibration method, both at the very light and the very dark end of the brightness spectrum. The systems and methods described herein are applied to images containing calibration patches, such as are used for printer calibration.

Figure 1:
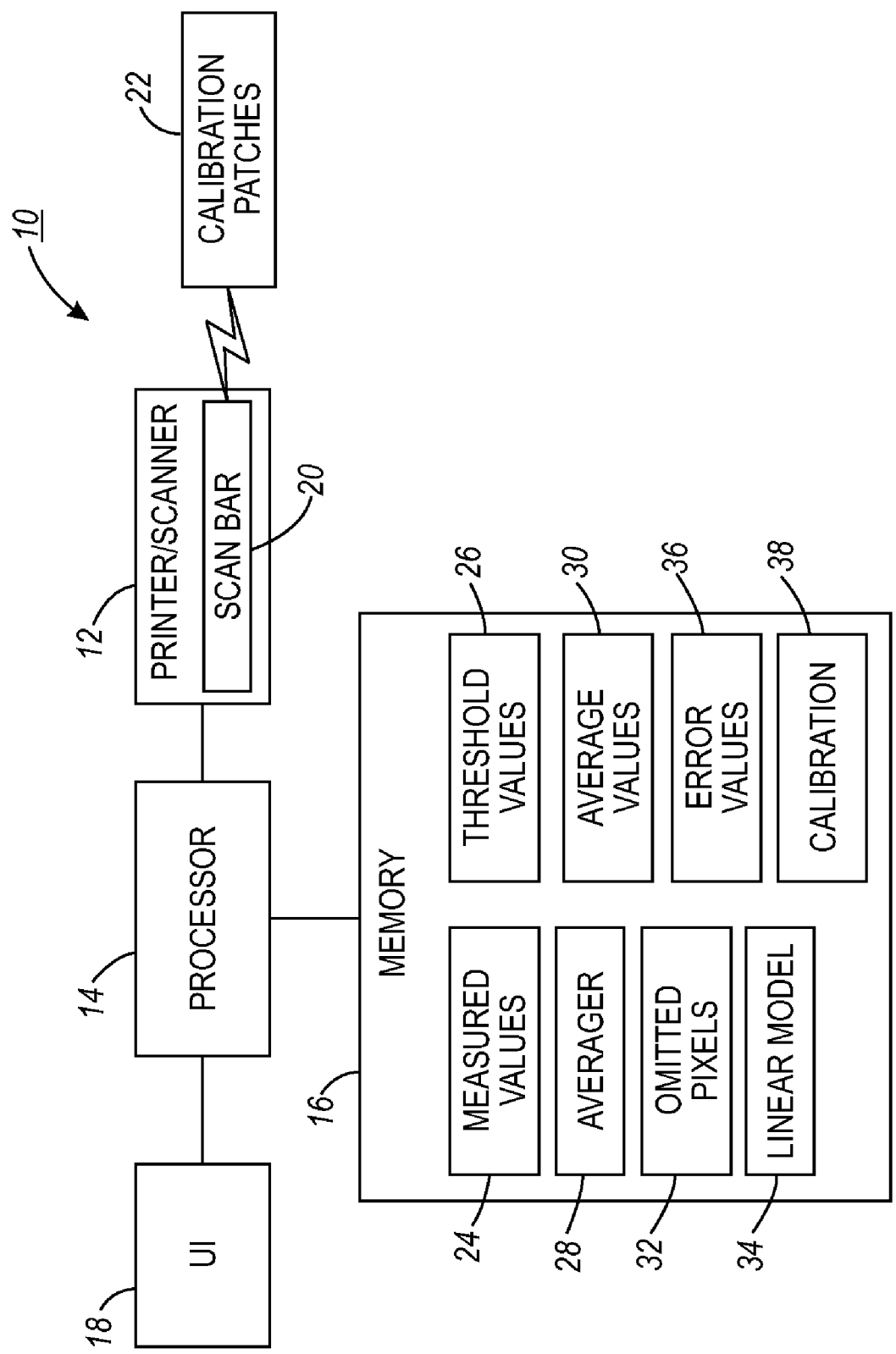
FIG. 1 illustrates a calibration system that includes a printing device, such as a printer or scanner, which is coupled to a processor.

With reference to FIG. 1, a calibration system 10 includes a printing device 12, such as a printer or scanner, which is coupled to a processor 14. The processor 14 is additionally coupled to a memory 16, and optionally to a user interface 18 by which information is presented to and/or received from a user. The printing device 12 includes a scan bar 20 that scans one or more calibration patches or sheets 22 to measure pixel values thereon for calibrating the printer 12. For example, a Xerox Freeflow™ 655 full-width array scan bar can be used to scan the calibration patches 22 for use in calibrating the printer 12.

The memory 16 stores calibration data and computer-executable instructions or algorithms for execution by the processor 14 when carrying out the various functions and/or methods described herein. For instance, measured pixel values 24 obtained by the scan bar 20 from the calibration patches 22 at a first threshold value 26 are stored in the memory 16. The processor 14 executes averaging instructions 28 for generating average pixel values 30 for each patch, and omitted pixel values 32 (e.g., for pixels that are clipped during the scan) are retained. The threshold value 26 is lowered, and measured pixel values 24 are obtained by the scan bar 20 from the calibration patches 22 at a new threshold value 26, and are stored in the memory 16. The processor 14 again executes instructions for generating average pixel values 30 for each patch at the second threshold value, and omitted pixel values 32 (e.g., for pixels that are clipped during the scan) are again retained.

The processor 14 generates a linear model 34 that is used to predict patch averages based on measured pixel values and pixels omitted during the scan at the second threshold value. The linear model thus predicts an error value 36 between a patch average calculated using all pixels in the patch and an average calculated using only non-clipped pixels in the patch. The linear model is than applied when scanning calibration patches at the first threshold value to improve error estimation accuracy, and the more accurate error estimation information is used when executing calibration instructions 38 to calibrate the printer 12.

According to an example, the calibration is carried out for each color separation (e.g., red, green, and blue), using all color separations. For each calibration patch, the average of all pixels less than a first predetermined maximum (e.g., "clipping"), or threshold, pixel value T is computed, and the count of omitted (e.g., clipped) pixels 32 is retained (e.g., stored in the memory 16). Taking a slightly lower threshold value t, e.g., a second maximum predetermined pixel value, clipping is again simulated. Patches that lose pixels when clipped at t, but that retain all pixels at the first maximum pixel value T, are used to build the linear model 34 to predict the patch averages (e.g., average pixel values) as a function of the pixels having pixel values below t and the numbers of pixels omitted from all of the color separations (e.g., for RGB, there are three color separations: red, green, and blue). The linear model 34 predicts the error 36 between the mean value calculated with only non-clipped pixels and the mean value calculated with all pixels. The same linear model 34 is applied to patches containing pixels clipped at the maximum threshold pixel value T, thereby providing improved estimates of the averages of those patches.

In this manner, statistics of the "good" pixels (e.g., those with values not indicative of clipping), along with the number of clipped (or suspect) pixels, are employed to estimate the true average of a given patch. For example, in an 8-bit system, pixels with a value 255 are either legitimately 255 or are clipped to 255, and classical approaches cannot distinguish between the two types of pixels (e.g., clipped or unclipped). Therefore, pixels at or above the clipping value (in this case 255) are considered to have values indicative of clipping. A pixel value of 255 is suspect.

The statistics are used to build the model 34, to predict the true mean value for the patch. For instance, statistics of training patches can be used to build the model 34, and then statistics of patches with clipped pixels can be used as inputs to the model 34 to obtain predicted values for those patches. Training patches include all patches that contain no suspect pixels, but can also contain pixels that may be "suspect" if the clipping threshold were slightly lower. Thus, for example, the statistics collection may include all patches containing no pixels with values greater than 254, but at least one pixel greater than 248. For each such patch, the calculated mean value and standard deviation, along with the numbers of clipped pixels in each separation, are recorded and employed as input to the model 34. The mean value and standard deviation in this example are computed using the pixels having pixel values less than the reduced threshold t (in this example 248). In addition, the true mean is recorded. Additional statistics of the patch can also be used if useful, including but not limited to kurtosis, skew, mean of the top 50%, and so on.

Once the statistics have been collected from all the training patches, the model 34 is built. According to one example, the model 34 is a linear model derived using linear regression, where the inputs are the mean pixel value and standard deviation of the (non-clipped) pixels, and the numbers of pixels clipped each of the color separations (for RGB, this is a total 5 inputs). To obtain an improved estimate of the patch average for a patch with suspect pixels, the mean, standard deviation, and numbers of clipped pixels in each of the separations are supplied as input to the linear model, and the output is the improved estimate.

Figure 2:
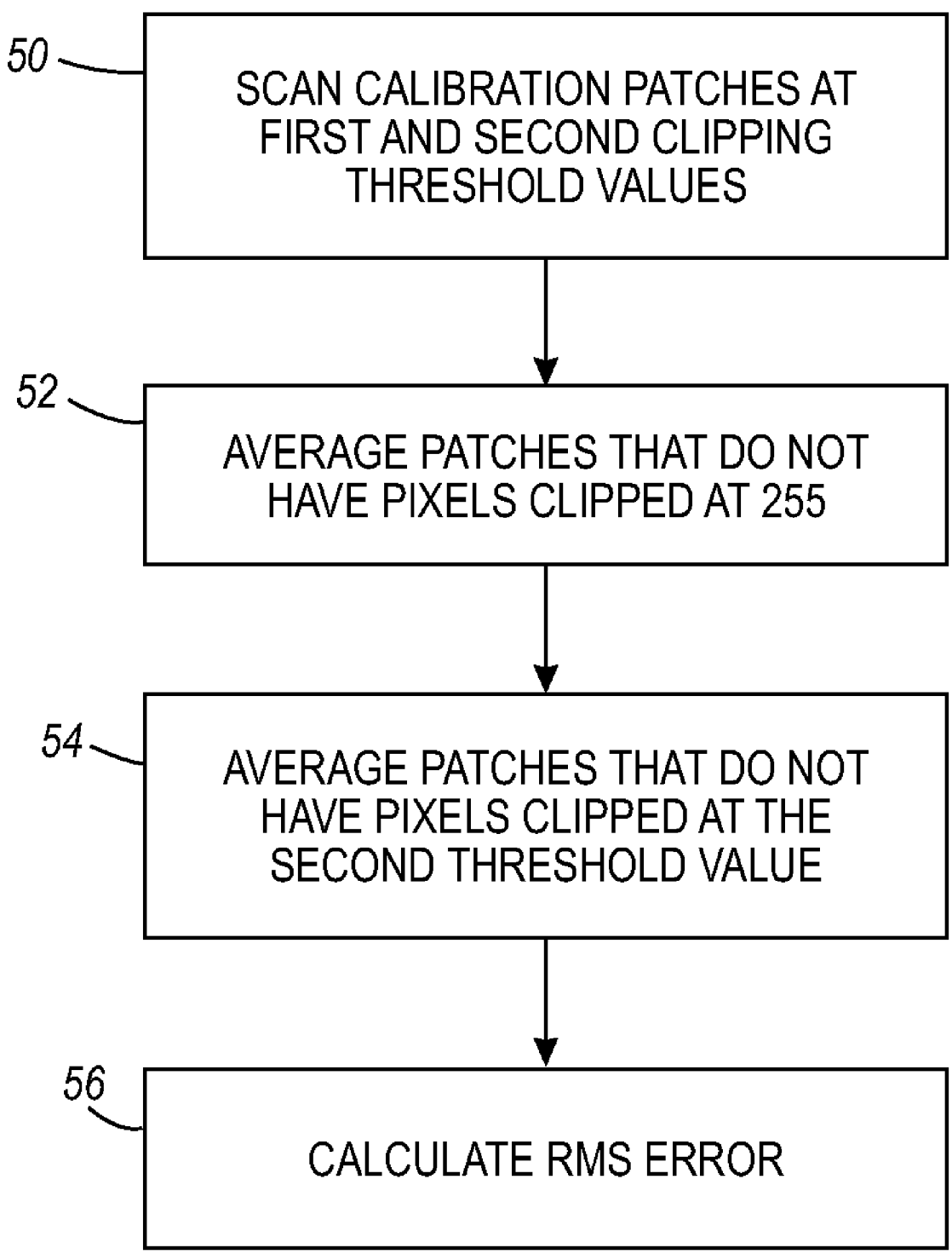
FIG. 2 illustrates a method of calibrating a scanner with improved error estimation and correction, in accordance with one or more aspects described herein.

FIG. 2 illustrates a method of calibrating a scanner with improved error estimation and correction, in accordance with one or more aspects described herein. The method is performed for each of a plurality of color separations, such as red, green, and blue, for example in an RGB scanner or the like. At 50, a scan is made of a calibration sheet containing a plurality of calibration patches. According to an example, the scan is performed by a Xerox Freeflow™ 655 scanner, with a first clipping threshold value T (i.e., a first predetermined maximum pixel value) at 255, and a second reduced threshold value t (i.e., a second predetermined maximum pixel value) of 230. The calibration sheet may contain, in this example, approximately 11,000 patches, each of which contains 50×50=2500 pixels.

At 52, the patches are averaged (omitting any patch with any pixel at 255), to give "truth". At 54, the patches are averaged based on a clipping value of 230, using the technique described with regard to FIG. 1, for all patches containing pixels above 229 (approximately 60 patches, according to this example).

In a test of the method, RMS error was calculated for the corrected and uncorrected versions of the averages to determine the effectiveness of calibration. The RMS error of the uncorrected averages was 8.3, while for the corrected patches it was 3.6. In this case, the largest error (in magnitude) improved from −41 to −21; the mean changed from −3.9 to −0.6; and the standard deviation improved from 7.3 to 3.6. Because the method involves extrapolating with a linear model, it is to be understood that the mean may not decrease all the way down to 0, however it improved by better than a factor of six. The patches with the largest errors (in magnitude) are those with the most clipped pixels. If patches with more than 1000 clipped pixels are rejected, and therefore not used in the printer calibration, the RMS drops to 1.3, the maximum to 5.3, the mean to −0.1, and the standard deviation to 1.3.

Figure 3:
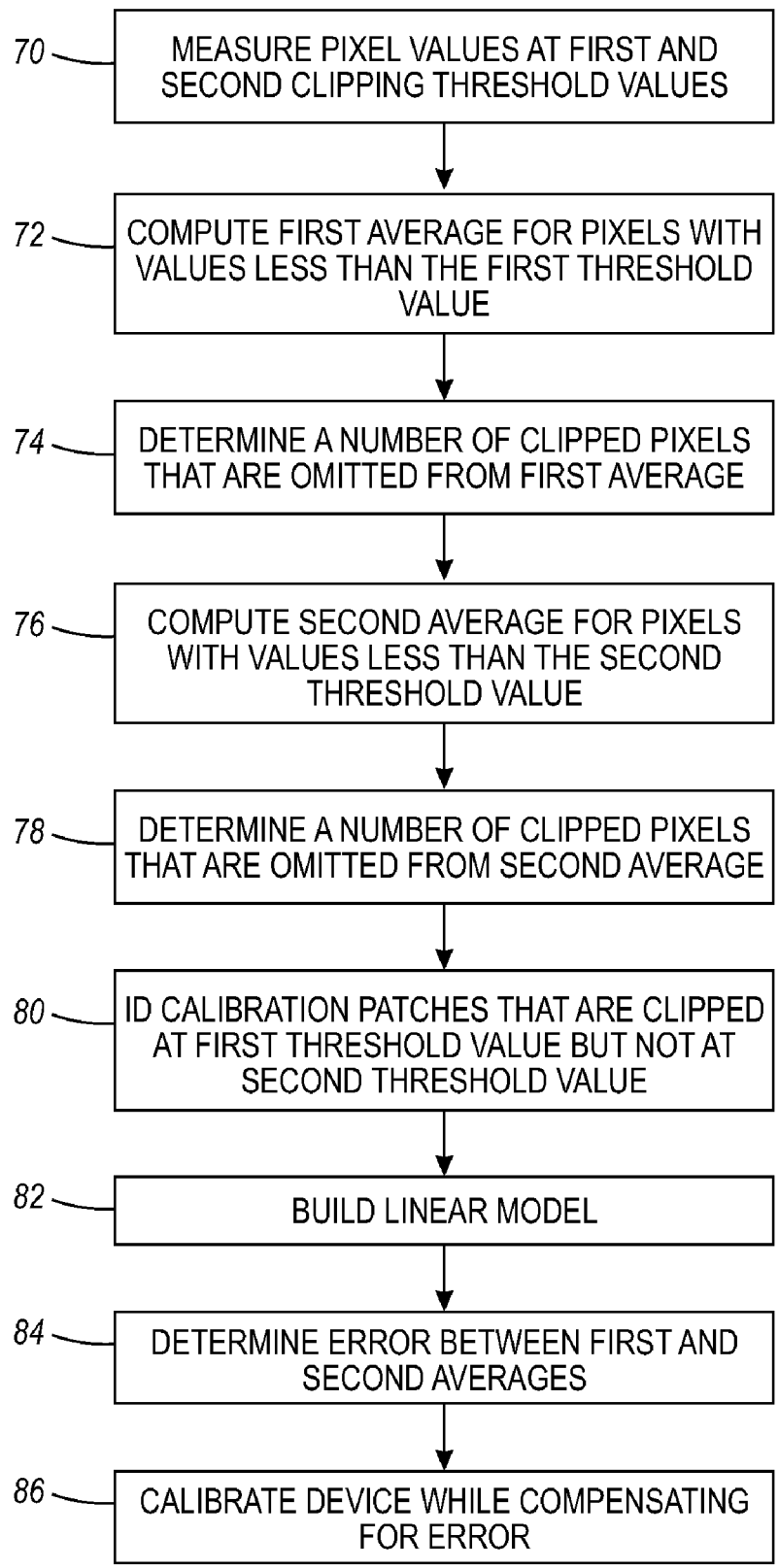
FIG. 3 illustrates a method for calibrating a scanner or printer with improved error estimation and compensation, in accordance with various features described herein.

FIG. 3 illustrates a method for calibrating a scanner or printer (e.g., an RGB scanner or the like) with improved error estimation and compensation, in accordance with various features described herein. At 70, pixel values are measured for one or more calibration patches each comprising a plurality of pixels. The measurements are taken at each of a first predetermined maximum pixel value (e.g., a first threshold value) T, and a second predetermined maximum pixel value t (e.g., a second threshold value. In one example, the second predetermined maximum pixel value t is lower than the first predetermined maximum pixel value T.

At 72 a first average pixel value is computed for pixels with pixel values less than the first predetermined maximum pixel value T. At 74, a number of omitted pixels is determined, which are not used to calculate the first average pixel value, wherein the omitted pixels have pixel values equal to or greater than the first predetermined maximum pixel value.

That is, the omitted pixels are "clipped" because they have values at least as great as the first predetermined maximum pixel value T.

At 76, a second average pixel value is computed for pixels with pixel values less than the second predetermined maximum pixel value t. At 78, a number of omitted pixels is again determined, which are not used to calculate the second average pixel value, wherein the omitted pixels have pixel values equal to or greater than the second predetermined maximum pixel value. At 80, calibration patches are identified that do not have pixels omitted (e.g., clipped) when measured at the first predetermined maximum pixel value, but that have pixels omitted (e.g., clipped) when measured at the second predetermined maximum pixel value.

At 82, a linear model is generated or built, which is used to predict patch averages based on the pixels having pixel values below the second predetermined maximum pixel value, and on a number of omitted pixels from all color separations (e.g., red, green and blue for RGB, etc.). At 84, the linear model is employed to determine an error between the first and second average pixel values. At 86, the printer or scanner is calibrated while compensating for the determined error. It will be appreciated that the method can be performed for each of a plurality of color separations (e.g., red, green, blue, etc.).

According to another feature, the linear model is applied to clipped calibration patches identified as having pixels that are omitted for having a pixel value lower than the first predetermined maximum pixel value. Additionally, the method may include estimating one or more average pixel values for the clipped calibration patches.

In another example, the method is performed to estimate and compensate for error in electronic images, where statistics within a window are used to predict corrected values for isolated pixels that are saturated. As in the case for patches, the method can be optimized in cases where only a few pixels within a window are clipped.

Figure 4:
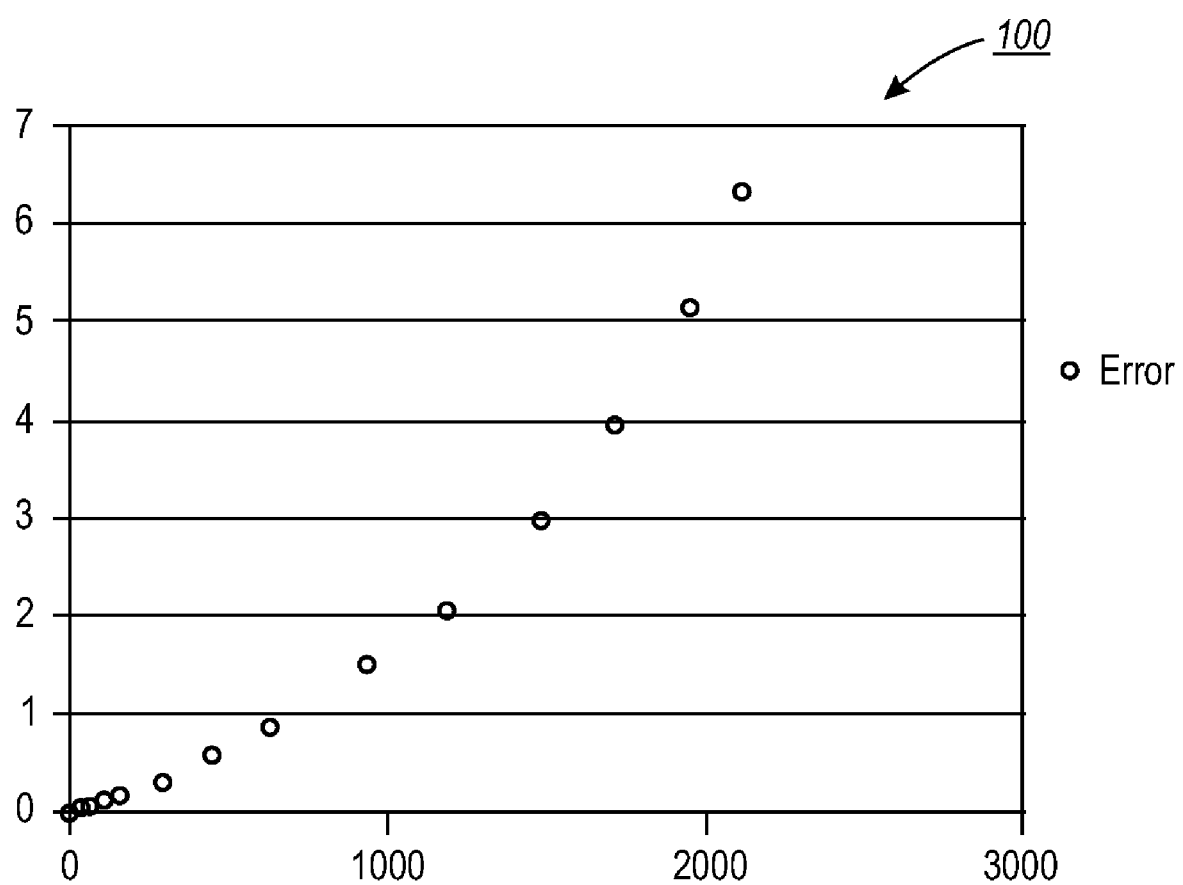
FIG. 4 illustrates a graphical representation showing error estimation for a mean of 2500 pixels with a true mean pixel value of 244, wherein the number of pixels clipped to a threshold pixel value of 255 is the independent variable.

FIG. 4 illustrates a graphical representation 100 showing error estimation for a mean of 2500 pixels with a true mean pixel value of 244, wherein the number of pixels clipped to a threshold pixel value of 255 is the independent variable.

It will be appreciated that the systems and methods described herein may be implemented on a computer (not shown). Further, it is to be appreciated that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiments.

The computer can include a processing unit such as the processor 14 of FIG. 1, a system memory such as the memory 16 of FIG. 1, and a system bus that couples various system components including the system memory to the processing unit. The processing unit can be any of various commercially available processors (e.g., a central processing unit, a graphical processing unit, etc.). Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The computer can further include a hard disk drive, a magnetic disk drive, e.g., to read from or write to a removable disk, and an optical disk drive, e.g., for reading a CD-ROM disk or to read from or write to other optical media. The computer typically includes at least some form of computer readable media. Computer readable media can be any available media that can be accessed by the computer. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A number of program modules may be stored in the drives and RAM, including an operating system, one or more application programs, other program modules, and program non-interrupt data. The operating system in the computer can be any of a number of commercially available operating systems.

A user may enter commands and information into the computer through a keyboard (not shown) and a pointing device or stylus (not shown), such as a mouse. Other input devices (not shown) may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus (USB), an IR interface, etc.

A monitor, or other type of display device, such as the UI 18 of FIG. 1, is also connected to the system bus via an interface, such as a video adapter (not shown). In addition to the monitor, a computer typically includes other peripheral output devices (not shown), such as speakers, printers etc. The monitor can be employed with the computer to present data that is electronically received from one or more disparate sources. For example, the monitor can be an LCD, plasma, CRT, etc. type that presents data electronically. Alternatively or in addition, the monitor can display received data in a hard copy format such as a printer, facsimile, plotter etc. The monitor can present data in any color and can receive data from the computer via any wireless or hard wire protocol and/or standard.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of calibrating a scanner, comprising:
measuring pixel values, for one or more calibration patches comprising a plurality of pixels, at each of a first predetermined maximum pixel value and a second predetermined maximum pixel value;
computing a first average pixel value from scan data acquired at the first predetermined maximum pixel value;
identifying a first set of omitted pixels;
computing a second average pixel value from scan data acquired at the second predetermined maximum pixel value;
identifying a second set of omitted pixels;
identifying calibration patches that do not have pixels omitted when measured at the first predetermined maximum pixel value, but that have pixels omitted when measured at the second predetermined maximum pixel value;
generating a linear model from the identified calibration patches, wherein the linear model is used to predict patch averages based on the pixels having pixel values below the second predetermined maximum pixel value and a number of omitted pixels from each of a plurality of color separations;
employing the linear model to determine an error between the first and second average pixel values; and
calibrating the scanner while compensating for the determined error.

2. The method of claim 1, further comprising:
applying the linear model to clipped calibration patches identified as having pixels that are omitted for having a pixel value lower than the first predetermined maximum pixel value; and
estimating one or more average pixel values for the clipped calibration patches.

3. The method of claim 1, wherein the first average value is computed from pixels with pixel values less than the first predetermined maximum pixel value.

4. The method of claim 1, wherein pixels in the first set of omitted pixels are not used to calculate the first average pixel value, and have pixel values equal to or greater than the first predetermined maximum pixel value.

5. The method of claim 1, wherein the second average value is computed from pixel values less than the second predetermined maximum pixel value.

6. The method of claim 1, wherein pixels in the second set of omitted pixels are not used to calculate the second average pixel value, and have pixel values equal to or greater than the second predetermined maximum pixel value.

7. The method of claim 1, wherein the second predetermined maximum pixel value is lower than the first predetermined maximum pixel value.

8. The method of claim 1, wherein the plurality of color separations includes at least three color separations.

9. A system that facilitates calibration error estimation for device calibration, comprising:
- a scan bar that scans a plurality of calibration patches, wherein each calibration patch comprises a plurality of pixels;
- a processor that:
    - measures pixel values for scans performed at each of a first threshold pixel value and a second threshold pixel value;
    - computes a first average pixel value from scan data acquired at the first threshold pixel value;
    - identifies a first set of pixels clipped at the first threshold pixel value;
    - computes a second average pixel value from scan data acquired at the second threshold pixel value;
    - identifies a second set of pixels clipped at the second threshold pixel value;
    - identifies calibration patches that do not have pixels clipped when measured at the first threshold pixel value, but that have pixels clipped when measured at the second threshold pixel value; and
    - generates a linear model from the identified calibration patches, wherein the linear model is employed to predict calibration patch pixel value averages based on the pixels having pixel values below the second threshold pixel value and a number of clipped pixels from each of a plurality of color separations.

10. The system of claim 9, wherein the processor predicts an error value between the first and second average pixel values, and compensates for the error when calibrating the device.

11. The system of claim 10, herein the processor applies the linear model to clipped calibration patches identified as having pixels that are omitted for having a pixel value lower than the first threshold pixel value, and estimates one or more average pixel values for the clipped calibration patches.

12. The system of claim 9, wherein the processor computes the first average pixel value from pixels with pixel values less than the first threshold pixel value.

13. The system of claim 9, wherein pixels in the first set of omitted pixels are not used to calculate the first average pixel value, and have pixel values equal to or greater than the first threshold pixel value.

14. The system of claim 9, wherein the processor computes the second average pixel value from pixel values less than the second threshold pixel value.

15. The system of claim 9, wherein pixels in the second set of omitted pixels are not used to calculate the second average pixel value, and have pixel values equal to or greater than the second threshold pixel value.

16. The system of claim 9, wherein the second threshold pixel value is lower than the first threshold pixel value.

17. The system of claim 9, wherein the plurality of color separations includes at least three color separations.

18. A method of compensating for scanner calibration error due to pixel clipping, comprising: scanning a plurality of calibration patches at first and second clipping threshold values; using a processor to perform the steps of: determining a first average pixel value for patches that have no pixels clipped at the first clipping threshold value; determining a second average pixel value for patches that have no pixels clipped at the second clipping threshold value; determining an error between the first and the second average pixel values; and compensating for the error when calibrating the scanner device.

19. The method of claim 18, wherein the first clipping threshold value is higher than the second clipping threshold value.

20. The method of claim 18, wherein the first clipping threshold value is 255.

* * * * *